May 5, 1931. J. H. EDWARDS 1,803,525
COMBINED TYPEWRITING AND COMPUTING MACHINE
Filed March 2, 1927    3 Sheets-Sheet 1

INVENTOR
James H. Edwards
BY Jacob Felbel
ATTORNEY

May 5, 1931.  J. H. EDWARDS  1,803,525
COMBINED TYPEWRITING AND COMPUTING MACHINE
Filed March 2, 1927   3 Sheets-Sheet 3

Patented May 5, 1931

1,803,525

UNITED STATES PATENT OFFICE

JAMES HENRY EDWARDS, OF SEATTLE, WASHINGTON, ASSIGNOR TO REMINGTON TYPEWRITER COMPANY, OF ILION, NEW YORK, A CORPORATION OF NEW YORK

COMBINED TYPEWRITING AND COMPUTING MACHINE

Application filed March 2, 1927. Serial No. 172,059.

My invention relates to combined typewriting and computing machines and it has for its principal objects to equip a machine of that character for making on a single line of writing two separate cross totals or balances and for providing proof of clearness.

In the present instance these cross totals are in two different kinds of numbers, one of them being in whole numbers, and the other in amounts in United States money with a space left for the decimal point.

My invention is applied to the Remington combined typewriting and computing machine which includes a series of vertical totalizers and a cross footer. I have contrived so as to mount on the cross truck two totalizers, one spaced for whole numbers, and the other for amounts in money, and have contrived to connect these up with the vertical totalizers in such a way that one of them will cooperate with a set of vertical totalizers arranged for whole numbers, and the other with another set of vertical totalizers arranged for amounts in money.

In connection with this arrangement I have also contrived to so modify the Remington proof of clearance mechanism as that it proves clearance of both of the cross totalizers separately.

To the above and other ends my invention consists in certain features of construction and combinations and arrangements of parts all of which will be fully set forth herein and particularly pointed out in the claims.

One embodiment of the invention is illustrated in the accompanying drawings, all of which are more or less fragmentary in character, only so much of the Remington combined typewriting and computing machine being shown as is necessary to an understanding of my invention.

The Remington combined typewriting and computing machine, hereinafter called the Remington machine, is of the general construction described in the patent to Wahl # 1,270,471, June 25, 1918. It includes a Remington typewriter having a platen 10 mounted on the usual carriage, printing types 11, and printing keys 12 which operate said types and including numeral keys which also operate the computing mechanism. The main frame of said computing mechanism includes a casting 13 screwed to the top plate of the typewriter and it also includes certain vertically disposed frame plates secured to said casting and projecting forward and downward therefrom. Of these the right-hand end plate 14, the plate 15 at the left end of the cross actuator, and the plate 16 at the right-hand of the vertical actuator appear in the drawing. In the machine as now manufactured a large part of the mechanism is covered up in front by cover plates 17.

The vertical actuator comprises mechanism operated by the numeral keys and including a vertical master wheel 18 which by certain devices not shown can be reversed for subtraction; and the motion of said vertical actuator is transmitted into the cross actuator where it operates certain mechanism including a reversible cross master wheel 20. The vertical actuator includes a differential shaft 21 whose motion is transmitted into the cross actuator by means including a link 22.

A main truck 23 is mounted to travel right and left with the typewriter carriage and on this truck I have shown mounted in the present instance dummies and totalizers 24, 25, 26, 27, 28, 29, 30, 31 and 32. Of these 24, 25, 27 and 28 are dummies (totalizer frames without movable mechanism therein), 26 is a totalizer arranged for whole numbers, and 29, 30, 31 and 32 are totalizers spaced for amounts in United States money. Each totalizer or dummy is secured in its appropriate position on the truck 23 by means including a latch lever 33 having a part engaging a rack 34 on the truck, said latch levers being held up against accidental loosening by means of stiff bow-spring devices 35. For the purposes of the present invention "dummies" and "totalizers" are equivalents, and in the claims I shall refer to them all as "totalizers."

Two cross totalizers 36 and 37 are mounted on the usual cross truck 38 which as more or less conventionally shown in the present drawing is constructed and mounted as described in the patent to F. A. Hart #1,464,095, dated August 7, 1923. Said truck is provided with wheels 40 that run on two tracks or rails 41 supported by the frame plates 14 and 15. The ordinary Remington cross truck is provided with a small plate 42 notched for cooperation with the usual latch lever 43 and also with a securing device 44, but these parts are adapted to cooperate only with one totalizer, and in the present instance the money totalizer 37 is secured in place by that means. The whole-number totalizer 36 at the left of it is dove-tailed onto the truck in the ordinary way, and it may be held against longitudinal motion on the truck by any suitable means (not shown) cooperating either with the totalizer 37 or with the bracket 45 projecting forward from the truck 38.

Figure 1:
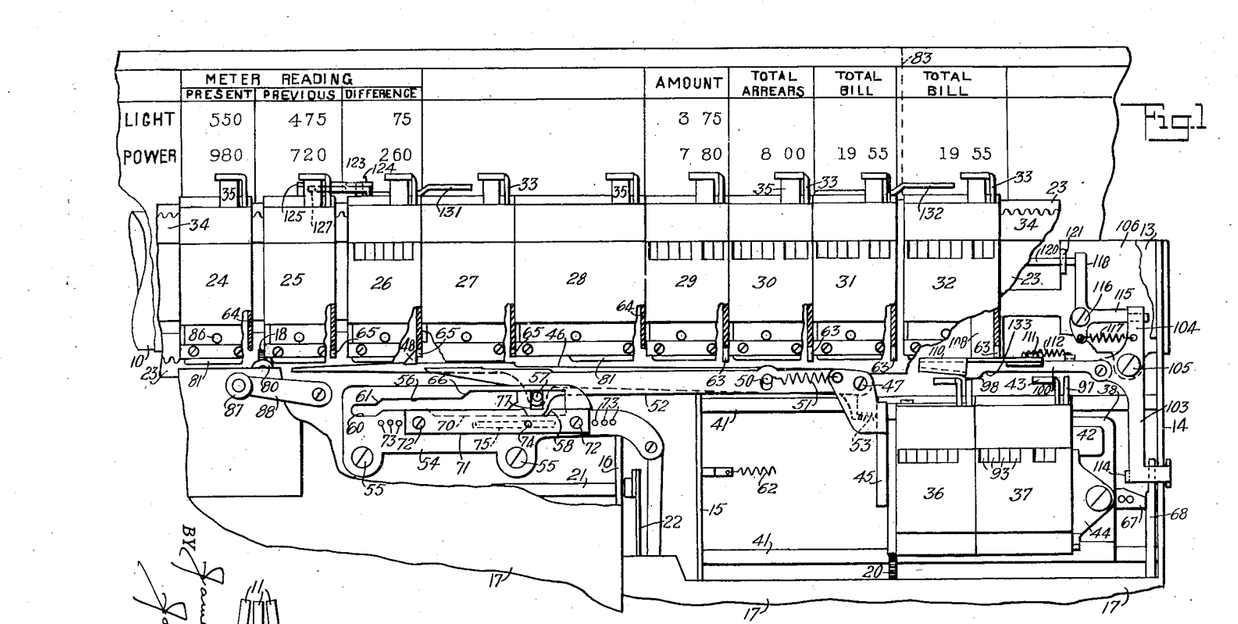
Figure 1 is a front view with a portion of a public service bill shown in position in the machine.

In Figure 1, I have shown conventionally a bill sheet 39 as if mounted on platen 10 and projecting upward in register with the various totalizers and dummies on the truck 23. This is a customer's statement of his account with a public service corporation, which furnishes two different kinds of service. In some instances this might be electricity and gas. In the present instance it is confined to electricity but this is sold at two different rates, depending on whether the current is used for lighting or for power purposes. At the left-hand side of the sheet (which in its up and down dimensions may be only a little wider than shown in the drawing) are three columns for meter readings. For convenience we may define these columns by the numbers which designate the dummies and totalizers. In column 24 is written the present reading of the meter, in column 25 the previous reading, and in column 26 the difference which of course will be the amount of current to be paid for. In order to compute this difference in totalizer 36 said totalizer must add the amount written in column 24 and subtract the amount written in column 25, and in order to clear totalizer 36 when writing the difference in column 26 said totalizer should subtract in that column also. At the right-hand part of the bill, in column 29, is written the amount due on the current computed and written in column 26. In column 30 is written any arrears or unpaid balance due from the customer and in column 31 the total amount due on the present bill. 83 represents a line of perforations between columns 31 and 32 so as to convert the right-hand end of the bill sheet into a stub that can be torn off by the customer to enclose with the check when he pays his bill. The total of the bill written in column 31 is copied on the stub in column 32. It will be perceived that in order to compute the total bill the amounts written in columns 29 and 30 should be added in cross totalizer 37, and in order to clear said cross totalizer the total written in column 31 should be subtracted in totalizer 37. The amount is copied in column 32 from the amount written in column 31.

Since there are two kinds of current at two different rates this bill would be written as follows: The first line including the bill for light would be written in the ordinary way, the writing of the difference in column 26 clearing totalizer 36 after which the carriage would be stepped over to column 29 and the amount due for light in the current month would be written there and added in cross totalizer 37, where it would be preserved. When the carriage is drawn back to write the second line this amount remains in totalizer 37, totalizer 36 however being clear, so that the operator can compute the amount of current used for power from the present and previous meter readings. Copying this amount in column 26 clears cross-totalizer 36. The amount of money due for this current is written in column 29 and added to the amount already in cross totalizer 37. Any arrears written in column 30 are added to the other two items and on writing the total in column 31 totalizer 37 is cleared. This totalizer therefore must not be operated in column 32.

The bracket 45 has as usual a pick-up device or "beam" 46 pivoted thereto at 47. This beam has the usual tooth 48 for cooperation with the pick-up lugs that commonly project downward from the right-hand frame plates of all Remington vertical totalizers. A pin 50 projecting forward from this beam is engaged by a spring 51 connected with the bracket 45 at such an angle as to exert a lifting tendency on the free end of the beam 46. This pin projects through a hole or slot in a sort of safety beam 52 which is also pivoted at 47 in front of the beam 46 and whose free end is adapted once the cross truck is set in motion to move up in register with the tooth 48 so that the lug on the vertical totalizer is held between said tooth and the end of the beam 52. A compression spring 53 tends to raise the free end of said beam 52.

The Remington machine in the vertical actuator thereof comprises a stationary plate 54 secured by two screws 55 to the casting 13 or to posts projecting forward from said casting. This plate has in it a horizontal slot 56 into which a pin 57 projects forward from the pick-up beam 46. In the machine as heretofore constructed the slot 56 is in effect a straight horizontal guide slot for the pin 57 except that near its right-hand end said slot is made with a notch 58 so as to allow the pin 57 to be depressed by the pick-up lugs on the vertical totalizers when the typewriter carriage is drawn toward the right, the tooth 48 being inclined on its left-hand face for that purpose; and except also that near its left-hand end said slot 56 is made with a downward off-set part 60 connected with the rest of the slot by an incline 61. This incline is so situated that in that step of the carriage where one of the vertical totalizers moves from its units position to its sub-units position the pin 57 will be cammed downward so as to free the tooth 48 of the pick-up beam from the vertical totalizer whereupon the cross truck is drawn back to its normal right-hand position by means of a long coiled spring 62 running over a pulley which latter, in order to avoid confusion of the drawing, is not shown in the present instance.

The incline 61 frees the cross truck for its jump back at the time when an ordinarily equipped vertical totalizer steps from its units to its sub-units position, the cross totalizer 37 which is secured to the cross truck in the ordinary way stepping at the same time from its units to its sub-units position. In the present instance it is desired to use the money cross totalizer 37 in conjunction with the money vertical totalizers 29, 30, 31 and 32 and these vertical totalizers are accordingly equipped with the ordinary pick-up lugs 63. It will be seen, therefore, that computations can be made in the last four columns of the paper and a balance struck in the cross totalizer 37 after the ordinary fashion of the Remington machine, and as far as these four columns are concerned the machine therefore adds and subtracts amounts of money in the ordinary way. The problem presented by the present piece of work is to cause the left-hand cross totalizer 36 to cooperate with the whole-number totalizers or dummies 24, 25 and 26, to compute the difference between the present and the previous reading of the meter. When a whole number is being written in the column defined by the dummy 24, cross totalizer 36 must be over master wheel 20. The cross truck must therefore lag behind dummy 24 a number of letter spaces of carriage travel equal to the distance from the wheel of lowest order in totalizer 36 to the wheel of lowest order in totalizer 37, which, in the particular instance shown in the drawing, is nine spaces.

It is therefore necessary when computing in columns 24, 25, and 26 that the cross truck be picked up and travel with the typewriter carriage but that it lag nine letter spaces behind its usual position under those conditions. This result will be brought about if the columns 24, 25 and 26 be made nine spaces wide and the cross truck be not picked up at all by the dummy 24 but is picked up by dummy 25. Accordingly, as indicated in Figure 1 where the vertical totalizers are all broken away to show the arrangement and the right-hand side plate 64 is shown in section at the back part thereof where the lug 63 is ordinarily located, said pick-up lug has been ground off entirely so that dummy 24 does not pick up the cross truck at all. The dummy 25 does pick it up however, being provided as shown in Figure 1 with a lug 65 for the purpose; but as this lug is nine spaces to the right of the side plate 64 of dummy 24 the cross truck will lag that many spaces behind and when it reaches the space of lowest order in column 24 the register wheel of lowest order in totalizer 36 will be in engagement with master wheel 20.

When the carriage steps from the units to the sub-units position of column 24 it is necessary that the cross truck be freed and allowed to jump back until the tooth 48 is caught on the lug 65 of totalizer 26 so that as the carriage travels through column 25 the cross truck will be traveling with it but again lagging the requisite nine spaces behind. When the end of column 25 is reached the cross truck is again freed and is caught by the lug 65 of dummy 27, which lug is purposely placed nine spaces to the right of the corresponding lug of totalizer 26. Numbers written in columns 24, 25 and 26 will therefore be cross computed in totalizer 36.

In order to release the cross-truck at the times specified, the plate 54 has been modified by cutting the right-hand portion of the slot 56 into a different shape as best shown in Fig. 1. That part of said slot is widened upward so as to allow the pin 57 to occupy normally a level somewhat higher than it has been permitted to occupy in the machine as heretofore constructed. This high part of the slot terminates at its left-hand end in an incline 66. The construction is such that the cross truck will travel leftward on a high level until the incline 66 is reached whereupon said pin and tooth will be cammed down to a second level. The incline 66 is in the present instance located nine letter spaces to the right of the incline 61. The pick-up lugs 65 on totalizers 25, 26 and 27 are ground off to something like half the length of the corresponding lugs 63 on the money totalizers. These lugs are ground off to such an extent that when at 66 the pin 57 is cammed down into the ordinary part of the slot 58 the tooth 48 is released from the lug 65 but the tooth is still high enough to be caught by the normal or ordinary pick-up lugs 63 of the money totalizers. The frame plate 64 of dummy 24 is ground off so short as not to catch the tooth 48 even in its highest position.

The operation therefore is as follows: When the carriage is drawn back to its extreme right-hand position and moves leftward into column 24 the plate 64 of dummy 24 passes over tooth 48 without touching it but said tooth is picked up by lug 65 of dummy 25 and the cross track is fed along until the pin 57 reaches the incline 66 down which it slides as dummy 24 moves to its sub-units position. This cams tooth 48 loose from dummy 25 and allows it to be caught on dummy 26 which carries the cross truck along in the same way through column 25, and dummy 27 carries the cross truck along through column 26. The dummy 28 has its side plate 64 cut off the same as that of dummy 24 so that it does not pick up the cross truck at all. The column defined by dummies 27 and 28 is appropriated to descriptive matter not computed. As the carriage travels through these columns and when it reaches about the middle of column 28 lug 63 of totalizer 29 will pick up the tooth 48 and start the cross truck into motion. Totalizer 36 will be passing over master wheel 20 about the right-hand half of column 28 so that when column 29 is reached totalizer 37 will be over the master wheel 20 and amounts written in that column will be computed into cross totalizer 37 in the ordinary way. The same applies to columns 30, 31 and 32.

The Remington cross truck is arrested in its rightward jump by a stop bar 67 which is adjustable in and out, this stop bar cooperating with a locking lever 68 which will be again referred to later on. Ordinarily where a cross totalizer of the size of totalizer 37 is in use alone this stop 67 would be adjusted some little distance rightward so as to arrest the cross truck just after totalizer 37 had passed the master wheel 20. This adjustment is a matter of convenience however and not of necessity, and the addition of the other totalizer 36 is made possible by adjusting the stop 67 into the short condition shown in the drawing so that master wheel 20 is just outside of totalizer 36 when the truck is arrested. The effect of this shortening up of the stop 67 is to cause the ordinary totalizers 29, etc. to pick up the truck sooner than necessary as far as these ordinary totalizers are concerned, and that is the reason why the cross truck begins to move in the middle of the column or space defined by dummy 28.

Figure 2:
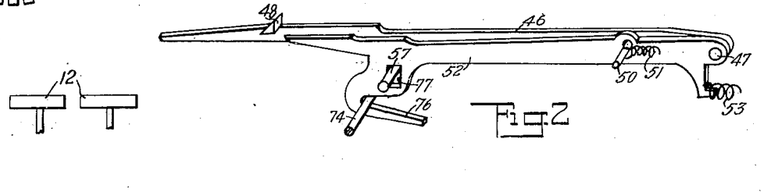
Figure 2 is a perspective view.

The slot 56 in the plate 54 has in the Remington machine near the right-hand part thereof a depression 70 indicated by dotted lines in Fig. 1 and this depression is covered by an auxiliary plate 71 secured to plate 54 by two screws 72. A series of holes 73 is provided in plate 54 for these screws, said holes a letter space distance apart so that plate 71 can be adjusted. It is in this plate that the notch 58 is made and the plate is so set as to locate this notch under the normal position of pin 57 which in the present instance is rather farther rightward than usual. The plate 71 also carries a pin 74 which projects through a slot 75 in plate 54, this pin being conventionally shown in Fig. 2, where it will be seen that in the normal or extreme right-hand position of the parts a cam or hook 76 of the safety beam 52 has run under said pin with the result of camming said safety hook down to a lower level than the tooth 48, so as to permit the carriage to be drawn back to the right without the lugs 63 striking this safety beam. This same operation takes place in the ordinary machine, the only difference being that as the beam 46 is now allowed to rise higher than before it is necessary to make this hook or cam 76 with more of a downward incline than formerly. For a similar reason it was necessary for me to lengthen upward the slot 77 in the beam 52 through which slot the pin 57 projects.

The locking lever 68 above mentioned is one element in a train of mechanism, the purpose of which is to lock up the actuator in case a vertical totalizer is in position for actuation but due to a misoperation of the machine the cross truck has not been picked up, a condition which would result in an error because the number would be written on the paper and computed in the vertical totalizer but would not be entered into the cross totalizer. Means have therefore been provided in the Remington machine for locking the cross totalizer under the double condition that (a) a vertical totalizer or dummy is over the master wheel 18, and (b) that the cross truck is in its normal right-hand position. Failing either of these conditions the lock does not work. The part of this mechanism immediately controlled by the vertical totalizers consists of a roller 80, Figs. 1 and 5, which is normally held up by a spring in the position shown in Fig. 1 but which is adapted to be slightly depressed by a rail or cam 81 constituting part of the framing of the totalizer or dummy. The condition of the lock being thrown into operation is therefore that lever 68, which is normally pressed slightly leftward by a spring, shall be held flat against the frame plate 14, as shown in Fig. 1, and that roller 80 be depressed by one of the cams 81. If roller 80 is depressed but, the cross truck having been picked up, lever 68 is in its left-hand position, the machine is not locked and on the other hand if the cross truck is holding lever 68 in its right-hand position but roller 80 is not depressed, then also the machine is not locked. Due to the addition on the cross truck of the extra totalizer 36 we have a situation where dummy 27 and the left-hand half of dummy 28 are over roller 80 at a time when the cross truck has not been picked up and should not be picked up. This ordinarily would make it impossible to write numbers in the area described, that is to say, in column 27 and the left-hand part of column 28. In dummy 27 I have therefore ground off the rail 81 so that it does not depress roller 80, and have done the same to the left-hand half of said rail 81 in dummy 28. Dummy 27 is needed in order to pick up the cross truck for column 26, and dummy 28 is useful for another reason that will be explained later on.

Figure 3:
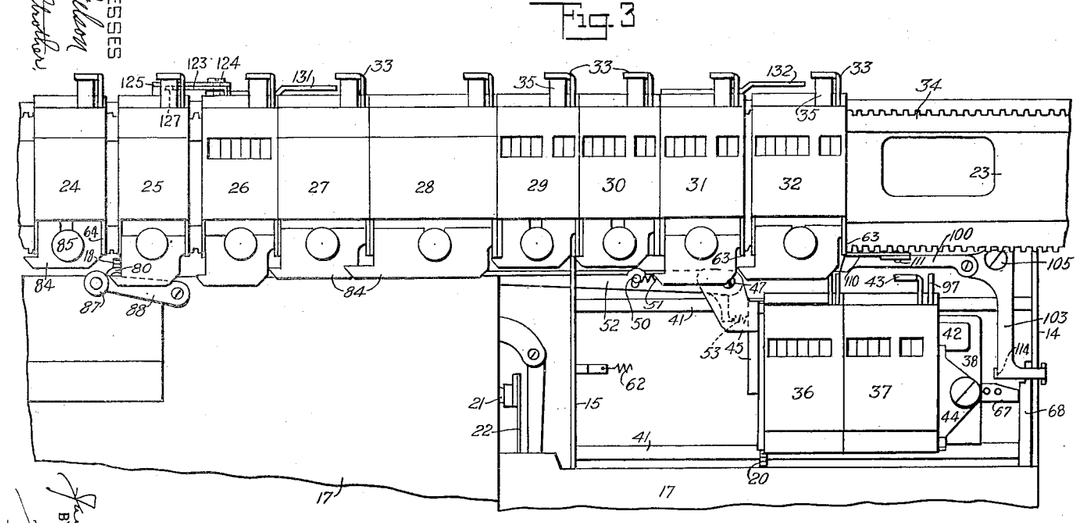
Figure 3 is a front view showing some parts that were omitted in Fig. 1.

The reversal of cross master wheel 20 for addition and subtraction and a disconnection of this master wheel in order that numbers may be written and not computed in the cross totalizer, are controlled in the same way in the present machine as in the ordinary Remington machine. Each dummy or totalizer has mounted on the lower front part thereof a controlling cam 84 which can be adjusted up and down to any one of three different positions in which it is secured by a screw 85. These cams are shown in Fig. 3 but they have all been removed in Fig. 1 in order to show the construction behind them, which construction has been described above. The screws 85 screw into holes 86 in the framing of the totalizers and dummies, said holes being shown in Fig. 1. The cams 84 control a follower roller 87 mounted on an arm 88 which is spring-pressed upward. The construction is such that when this roller occupies its uppermost position, shown in Figs. 1 and 3, cross master wheel 20 will add; if the roller 87 be slightly depressed the cross master wheel 20 will be disconnected; and if said roller be still further depressed cross master wheel 20 will subtract. In Fig. 3, these cams are shown set up for the program above described, that is to say, to add in columns 24, 29 and 30, to subtract in columns 25, 26 and 31, and disconnect in columns 27, 28 and 32. It is in order to furnish a mounting for the disconnect cam 84 that dummy 28 is used. It might be necessary to write numbers in the column defined by this dummy and during the passage of the carriage through the right-hand part of this column, totalizer 36 is passing over cross master wheel 20 and it is therefore desirable that this master wheel be disabled at that time.

Figures 4, 5, 6:
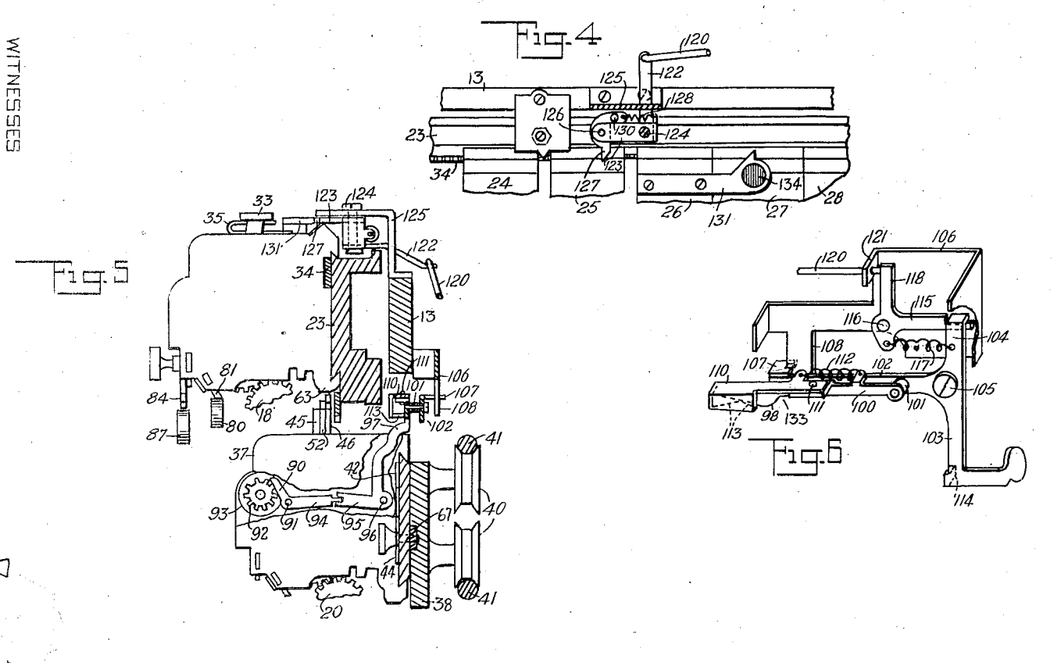
Figure 4 is a top view of a portion of the mechanism.
Figure 5 is a right-hand side view partly in section.
Figure 6 is a perspective view of a portion of the proof of clearance mechanism.

Dummies 24 and 25 could be vertical totalizers if desired, but there is no necessity for keeping a sum total of the numbers written in those columns. 29 is desirably a totalizer because that preserves the sum total of all of the bills for the month. 30 preserves the sum total of all of the arrears, and 31 the sum total of all the bills as presented. The principal reason for making 31 and 32 totalizers instead of dummies is for purposes of comparison. The amount written in column 32 is copied from column 31 and these two totalizers serve as a check on the accuracy of this copying. If they show the same total the operator is assured she has copied all of the amounts correctly on to the stubs, but if these two totalizers do not harmonize she knows that she has made a mistake. The Remington machine includes clearance proof mechanism for the cross totalizer of the sort described in the patent to Poole #1,491,167, dated April 22, 1924, and I use that mechanism with certain modifications which will be pointed out. Said mechanism includes a comb 90 extending across the cross totalizer and pivoted in the side plates thereof at 91, said comb including a series of thin arms and adapted to be rocked about the pivots 91 against the teeth of the pinions 92 of the dial wheels 93 of the totalizer. In each pinion the tooth that stands in the path of the comb 90 when the dial 93 stands at zero is shortened so that said comb can swing further toward the front of the machine, if all of the wheels stand at zero, than it can if some one or more of the dials indicates some other number than zero. Said comb has a forwardly projecting arm 94 articulated with an arm 95 of a bell crank pivoted at 96 and having an arm 97 in the nature of a finger projecting upward through a front-to-rear slot in the top casing plate of the totalizer. The construction is such that when as shown in Fig. 5 all of the wheels of the totalizers stand at zero this finger 97 can occupy its rear position but if any one of said wheels is not at zero a long tooth of the corresponding pinion would force the comb 90 rearward, which would force the finger 97 to occupy a position forward of that shown in Fig. 5.

The finger 97 is adapted to cooperate with a cam 98 at the left-hand end of a plate 100 which is secured by posts 101 to a lever arm 102, said posts spacing said plate a short distance in front of said lever arm. The arm 102 is one arm of a three-armed lever which comprises also a depending arm 103 and an upstanding arm 104, said lever being pivoted on a stud 105 projecting forward from a frame plate 106 secured to the main casting 13 and for the most part lying a short distance behind said casting. The arm 102 has an ear 107 bent off therefrom and a notch cut in this ear embraces a depending part 108 of the bracket 106 and guides the arm 102 accurately up and down. The position of the arm is such that the cam 98 stands directly in the path of the finger 97 when the latter is in its rearmost position, indicating that the totalizer is clear.

In order to force the finger 97 into such rear position in case the totalizer is clear a cam lever 110 is pivoted at 111 on an ear of the bar or plate 100, and said lever 110 is influenced by a spring 112 to turn toward the rear of the machine. The lever 110 is made of sheet metal, which at its forward part is bent first downward and thence rearward, the rearwardly projecting part of it being shaped with bevels 113 which engage the finger 97 and transmit to it the stiff pressure of the spring 112, tending as the finger approaches the cam 98, on the jump back of the cross truck, to force the finger 97 into its rear position underneath the cam 98. This it will do if the totalizer is clear but if the totalizer is not clear so that the finger cannot move back the lever 110 will itself spring forward against the tension of spring 112.

In short, if the lever arm 102 is in its downward position at the time of a jump back of the cross totalizer it will remain in that position if the cross totalizer is not clear but will be elevated if said cross totalizer is clear. The depending arm 103 of the locking lever has an ear 114 bent off therefrom in such position as, when the arm 102 is in its lowered position, to strike the lever 68 and operate the lock for the vertical actuator, thus indicating to the operator that the totalizer is not clear.

The three-armed lever is normally held in its upper inoperative position, shown in the drawings, by means of a latch lever 115 pivoted to the plate 106 at 116 and having a notch that is engaged by an ear bent rearward from the upper end of the upstanding arm 104 of the three-armed lock lever. A spring 117 connects the arm 104 with an arm of the lever 115, said spring tending to hold the latch lever 115 in latching engagement and tending also when the latter is released to rock the three-armed lever to its locking position.

The latch lever 115 has an upstanding arm 118 adapted to be struck by a push wire or rod 120 which at its right-hand end is guided in an ear 121 bent off from the frame plate 106. This push rod at its left-hand end, Figs. 4 and 5, is pivoted to the rearwardly directed arm 122 of a bell crank having also a horizontal arm 123, said bell crank pivoted at 124 to a sheet metal bracket 125 secured to the main casting 13 a little to the right of the middle of the machine. The arm 122 is lower than the arm 123 and projects through a suitable opening in the bracket 125. The arm 123 has pivoted thereto at 126 a dog 127 projecting toward the front of the machine, and beveled on its right-hand face as shown in Fig. 4. Said dog is provided with a tension spring 128 and with stop pin 130, these parts so disposed that the dog cannot turn clockwise from the position shown in Fig. 4 but can turn counter-clockwise against the tension of the spring 128.

On any desired vertical totalizer or dummy a trip cam can be mounted adapted to strike the dog 127 during the leftward movement of the carriage and rock the bell crank 123, 122 and trip the latch 115 to allow the three-armed locking lever 102, 103, 104 to drop to its locking position where the ear 114 will hold the lever 68 against the frame plate 14 even though the cross truck be picked up and drawn leftward at the time. In the present instance two trip cams 131 and 132 are employed, the first mounted on totalizer 26 to test for clearance of cross totalizer 36 after writing the difference in column 26 and the other mounted on totalizer 31 and adapted to test for clearance of the money totalizer 37 after writing in column 31. If the writing of the difference in column 26 does not clear cross totalizer 36 the machine will be locked when the operator undertakes to write the first amount in the column 29, and if the writing of the total in column 31 does not clear the totalizer 37 then the machine will be locked when the operator undertakes to copy the total onto the stub in column 32.

It will be obvious that it would be impossible for the single locking lever 102, 103, 104 or the single cam 98 to test two different totalizers for clearance unless special provision were made different from the precise construction of these parts as heretofore manufactured and as described in the Poole patent hereinbefore referred to.

As heretofore manufactured and as described in said Poole patent the cam bar or plate 100 has its lower edge inclining upward at the left-hand end of the bar to constitute the cam 98, said edge running straight and horizontal from the end of said incline to the right-hand end of the bar so that when a finger 97 runs under this cam, it will raise the bar and hold it elevated. If that were the construction in the present instance then at the time when the difference was being copied in column 26 cross totalizer 36 would be over the master wheel, but the finger 97 of totalizer 37, if the latter was clear at the time, might be standing under the straight edge of the cam bar 100, and when the trip cam 131 operated the dog 127 the three-armed locking lever would be unable to drop to its locking position whether totalizer 36 was clear or not.

In order to provide for this situation I use a cam bar 100 of such length that the finger 97 of totalizer 37 is still under said bar and has not quite reached the cam edge 98 at the time when totalizer 36 reaches its sub-units position and the cross truck is released and jumped back; and I cut away the bar 100 from underneath as indicated at 133 with the result that when trip cam 131 releases the three-armed locking lever the latter can drop down to its locking position or at least far enough to free itself from the latch 115 even though totalizer 37 be clear at the time and its finger 97 underneath the bar 100. Under these conditions when passing out of column 26 the three-armed lever will be tripped and allowed to drop and whether or not it will be immediately raised on the jump back of the carriage will depend entirely on whether or not the totalizer 36 is clear.

When the total of the bill is written in column 31, an operation which should clear totalizer 37, said totalizer is entirely at the left of the cam bar 100 and cam 98. If at the end of that column the cross truck jumped entirely back to its normal position shown in the drawings and if cross totalizer 36 was clear at the time as it should be, its finger 97 would unlock the machine whether cross totalizer 37 was clear or not. This situation is saved by the totalizer 32 whose pick-up lug 63 catches the tooth 48 and arrests the cross truck before the latter has moved far enough rightward to bring the finger 97 of totalizer 36 into engagement with cam 98. If totalizer 37 was not clear therefore the keys will be locked when the carriage comes into column 32.

On account of the presence of two totalizers on the cross truck 38 it is necessary in order to pick up said cross truck to move the typewriter carriage and main truck 23 further to the right than an operator would probably be accustomed to doing if she had been in the habit of operating an ordinary Remington machine. I have therefore as shown in Fig. 4 put a conspicuous red spot 134 on the trip cam 131 of the totalizer 26 to indicate to the operator that if she desires to pick up the cross truck in order to make a correction in the money columns she must pull the carriage back to the right until this red spot comes to a certain position with reference to the stationary parts of the machine, such position in the particular set-up shown in the drawings being not far from that shown in Fig. 4.

It will be perceived that by the arrangement and the devices shown and described I am able to compute not only two different cross totals or balances but two different kinds of such totals and balances; in other words, to do two entirely separate cross computations on the same bill, neither of them interfering in any way with the other and all with one cross master wheel 20; and moreover, to test the two cross totals or balances separately for clearance.

What I claim as new and desire to secure by Letters Patent, is:—

1. In a combined typewriting and computing machine, the combination with a carriage traveling through a series of column positions, a cross-truck for two cross-totalizers, and a pick-up device for said cross-truck, of means for guiding said pick-up device at one level in the field of one of said cross totalizers and at another level in the field of the other cross totalizer, pick-up lugs on said traveling carriage, said lugs being at two heights corresponding to the two said levels, means for moving said pick-up device from one of said levels to the other when the cross-truck moves out of the field of the first specified cross-totalizer, and means for moving said pick-up device to a third or disconnecting level when said cross-truck moves out of the field of the second cross-totalizer.

2. In a combined typewriting and computing machine, the combination of a traveling carriage, a series of vertical totalizers, a cross truck having totalizing mechanism and a cross master wheel, a pick-up device, pick-up lugs associated with said vertical totalizers, and a guide for said pick-up device adapted to guide said device in the first part of its travel at one level, and then to a second level, and then to guide said device to a third level, some of said lugs releasing said device when it moves from the first to the second level, and some of said lugs releasing said device when the latter moves to its third level.

3. In a combined typewriting and computing machine, the combination of a traveling carriage having column-defining devices mounted thereon including a vertical totalizer 29, a cross truck, totalizing mechanism on said truck of greater width than said totalizer 29, a master wheel for said cross totalizing mechanism, cam and follower mechanism for controlling the state of said master wheel as to add, subtract and disconnect, the cams of said mechanism being mounted on said column-defining devices and said column-defining devices including a dummy just at the left of the totalizer 29 and having a disconnect cam thereon to prevent numbers written at the left of column 29 from being entered into said cross totalizing mechanism, and a pick-up device for said cross truck, said totalizer 29 having associated therewith a pick-up lug for said pick-up device, but said dummy being adapted freely to pass said pick-up device.

4. In a combined typewriting and computing machine, the combination with a traveling carriage, two sets of vertical totalizers, a cross truck, two cross totalizers one for cooperation with each of said sets of vertical totalizers, and suitable pick-up mechanism for said cross truck to cause one of said cross totalizers to be acted on by said master wheel in conjunction with one set of vertical totalizers, and the other cross totalizer to be acted on in conjunction with the other set of vertical totalizers; of clearance proof mechanism for the two said cross totalizers including a locking lever normally latched in unlocking position, two means for unlatching said lever one such means associated with each of said sets of vertical totalizers, said locking lever having a cam and each of said cross totalizers having a device adapted to act on said cam to move said lever to unlocking position in case that totalizer is clear, said cam being short and so located as to clear the device of one cross totalizer at the time when the cam should be controlled by the said device of the other cross totalizer.

5. In a combined typewriting and computing machine, the combination with a traveling carriage, a jumping cross-truck, and two cross totalizers, of clearance proof mechanism including a locking lever, means for causing said lever to move to locking position once when the first of said cross totalizers should be clear and again when the second of said cross totalizers should be clear, a cam on said locking lever, two devices one in each of said cross totalizers for engaging said cam to restore said locking lever in case the respective cross totalizer is clear, and means controlling the extent of movement of said cross truck in both directions so that when working in the column where the first cross totalizer should be cleared the second restoring device will not reach said cam and when working in the column where the second cross footer should be cleared the first restoring device will not reach said cam.

6. In a combined typewriting and computing machine, the combination with a traveling carriage, a series of vertical totalizers, two cross totalizers, a single master wheel for both cross totalizers, a cross truck, and a pick-up device for said cross truck; of pick-up lugs of two different forms, two different means for disconnecting said pick-up device from said lugs at different points in the travel of said pick-up device, one of said disconnecting devices being adapted to disconnect said pick-up device from the lugs of one form and the other of said disconnecting devices being adapted to disconnect said pick-up device from lugs of the other form.

7. In a combined typewriting and computing machine, the combination with a traveling carriage, two sets of column-defining devices including vertical totalizers, a cross truck, two cross totalizers, a single master wheel for both said cross totalizers, and a pick-up device for said cross truck; of pick-up lugs associated with the vertical totalizers and of two different forms, one column-defining device of one set being adapted freely to pass said pick-up device and the lug associated with the next adjacent vertical totalizer being of one of said forms, the lugs of the vertical totalizers of the other set being of the other of said forms; and two different devices for disconnecting said pick-up device from said lugs at different points in the travel of said pick-up device, one of said disconnecting devices being adapted to disconnect said pick-up device from lugs of one form and the other of said disconnecting devices being adapted to disconnect said pick-up device from lugs of the other form.

Signed at Seattle in the county of King and State of Washington, this 19th day of February, A. D. 1927.

JAMES HENRY EDWARDS.